United States Patent [19]

Weber

[11] 4,434,145
[45] Feb. 28, 1984

[54] SIMULTANEOUS SCRUBBING AND OXIDATION OF HYDROGEN SULFIDE USING EXCESS VANADATE

[75] Inventor: Guenter Weber, Linden, Fed. Rep. of Germany

[73] Assignee: Linde Aktiengesellschaft, Wiesbaden, Fed. Rep. of Germany

[21] Appl. No.: 406,806

[22] Filed: Aug. 10, 1982

[30] Foreign Application Priority Data

Apr. 30, 1982 [DE] Fed. Rep. of Germany ....... 3216158

[51] Int. Cl.³ ...................... B01D 53/34; C01B 17/05
[52] U.S. Cl. ................................... 423/226; 423/224; 423/573 R
[58] Field of Search ................... 423/226, 224, 573 G, 423/573 R

[56] References Cited

U.S. PATENT DOCUMENTS 4,125,597  11/1978  Fleck ............................... 423/573 R

FOREIGN PATENT DOCUMENTS 1488659  10/1977  United Kingdom ............ 423/573 R

OTHER PUBLICATIONS

Kohl et al. "Gas Purification", 3rd Ed., 1979, Gulf Publishing Company, Houston, pp. 476–482.

Primary Examiner—Earl C. Thomas
Attorney, Agent, or Firm—Millen & White

[57] ABSTRACT

In the scrubbing and simultaneous oxidation of hydrogen sulfide with an aqueous alkaline scrubbing solution containing five-valent vanadium as the oxidizing agent, the sulfide being converted into higher oxidation states with simultaneous reduction of the five-valent vanadium to four-valent vanadium, the scrubbing solution subsequently being regenerated for reuse in a downstream oxidizer by treatment with an oxygen-containing gas for the reoxidation of the four-valent vanadium, to avoid losses of vanadium when the pH in the scrubbing solution is below 9.5, using the vanadium in a ration which exceeds the stoichiometric ratio for the oxidation of the hydrogen sulfide.

4 Claims, No Drawings

SIMULTANEOUS SCRUBBING AND OXIDATION OF HYDROGEN SULFIDE USING EXCESS VANADATE

CROSS-REFERENCE TO RELATED APPLICATION

This application relates to concurrently filed application entitled "CARBONATE ION CONTROL TO PREVENT LOSSES OF VANADIUM IN OXIDATION OF HYDROGEN SULFIDE", of Guenter Weber, the contents of which are incorporated by reference herein.

BACKGROUND OF THE INVENTION

This invention relates to a process for the removal of hydrogen sulfide from gas mixtures by scrubbing with an aqueous alkaline scrubbing solution containing five-valent vanadium (vanadate) as the oxidizing agent. The sulfide of the hydrogen sulfide is converted into higher oxidation states with the simultaneous reduction of the five-valent vanadium to four-valent vanadium. The scrubbing solution is preferably subsequently regenerated for reuse in a downstream oxidizer by treatment of an oxygen-containing gas for the reoxidation of the four-valent vanadium.

A process of this type is described, for example, in British Patent Specification No. 1,488,659. According to this process, the gas to be cleaned is scrubbed with an aqueous alkaline solution, such as a sodium carbonate solution having a pH between 8 and 9, this solution containing a soluble salt, such as the sodium salt of anthraquinonedisulfonic acid, and a metal vanadate, the vanadium being in the five-valent oxidation state. The absorbed hydrogen sulfide dissociates in the solution with the formation of $HS^-$ ions which reduce the vanadium to the four-valent oxidation states, elementary sulfur being liberated. The reduced vanadium can be reoxidized by an oxidation reaction with an oxygen-containing gas in the presence of the anthraquinonedisulfonic acid.

It has been demonstrated that, at low pH values, for example below 9.5, in the scrubbing solution, a difficulty arises insofar as the rate of reaction of reoxidation of vanadium is decreased. In such cases, it is frequently not economically feasible to achieve complete reoxidation of vanadium. Thus only a part of the vanadium dissolved in the scrubbing solution is available in the five-valent state for subsequent absorption of the scrubbing solution with hydrogen sulfide.

SUMMARY OF THE INVENTION

Thus, an object of the present invention is to prevent losses of the five-valent vanadium used to oxidize hydrogen sulfide in alkaline aqueous scrubbing solutions.

Upon further study of the specification and appended claims, further objects and advantages of this invention will become apparent to those skilled in the art.

These objects are attained according to the invention by employing five-valent vanadium, when the pH in the scrubbing solution is below 9.5, in a ratio which exceeds the stoichiometric ratio for the oxidation of the hydrogen sulfide. The stoichiometric ratio of vanadium to hydrogen sulfide on a weight basis is about 3.0.

The invention depends on the recognition that, when hydrogen sulfide makes contact with four-valent reduced vanadium, there is the possibility that vanadium is reduced to a lower-valent compound (below four-valent). Since these lower-valent vanadium compounds have a lower solubility than four- or five-valent vanadium, they precipitate in the scrubbing solution and are no longer available in the scrubbing process. These losses of vanadium can be avoided or reduced when the content of five-valent vanadium, which is in addition to the four-valent vanadium, on loading is larger than or equal to the stoichiometric content of vanadium corresponding to the hydrogen sulfide loading.

This can be achieved in accordance with a further embodiment of the process according to the invention by maintaining the total concentration of the vanadium dissolved in the scrubbing solution larger than the stoichiometric vanadium concentration for the hydrogen sulfide loading to the extent of at least the content of four-valent vanadium remaining on reoxidation in the steady state of the scrubbing process.

The lower the pH of the scrubbing medium passed to the regenerator, the lower will be the efficiency of reoxidation. Consequently, for any given system, the stoichiometric excess can be readily calculated, whether overall or just the five-valent vanadium.

The maximum concentration of the reduced oxidizing agent available for reaction with oxygen is limited by the fact that the solubility of reduced oxidizing agent downstream from the scrubbing column should not be exceeded. If, due to this limitation, the concentration of reduced oxidizing agent is exceeding this limitation the reduced oxidizing agent must be kept in solution by adding agents to the scrubbing solution, such as complexing agents, for example citric acid, tartaric acid, etc. These agents have no effect on oxidation nor on reoxidation.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

A scrubbing solution is used which contains vanadium and anthraquinonedisulfonic acid as the oxidizing agent. The loading of the scrubbing solution with hydrogen sulfide is 400 mg/l, which corresponds to 1.2 g/l of vanadium.

At a pH of 8.5, the reoxidation of vanadium in a particular oxidizer is only about 70%. At the concentration of 1.2 g/l of vanadium which is stoichiometric for the loading of hydrogen sulfide, only 0.84 g/l of vanadium in the five-valent reoxidized oxidation state would be available after regeneration for reaction with hydrogen sulfide.

To avoid overloading of the scrubbing solution with $H_2S$, the total concentration of vanadium in the scrubbing solution required according to the invention to be at least 1.71 g/l, calculated as follows:

$$\frac{400 \cdot 10^{-3} \cdot 3}{0.7} = 1.71$$

EXAMPLE 2

A scrubbing solution is used which contains vanadium and anthraquinonedisulfonic acid as the oxidizing agent. The loading of the scrubbing solution with hydrogen sulfide being 300 mg/l, which corresponds to 0.9 g/l of vanadium.

At a pH of 9.4, the reoxidation of vanadium under the same conditions as in Example 1 is about 90%, so that only 0.8 g/l of vanadium in the five valent oxidation state are available after regeneration for reaction with hydrogen sulfide. Thus, according to the invention, a minimum total concentration of vanadium in the scrubbing solution is required to be 1.0 g/l of vanadium, calculated as follows:

$$\frac{300 \cdot 10^{-3} \cdot 3}{0.9} = 1.0$$

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the removal of hydrogen sulfide from a gaseous mixture comprising:

(a) scrubbing said gaseous mixture with an aqueous alkaline scrubbing solution containing anthraquinone disulfonic acid and five-valent vanadium as the oxidizing agent, whereby the sulfide of the hydrogen sulfide is converted into higher oxidation states with simultaneous reduction of the five-valent vanadium to four-valent vanadium; and (b) regenerating the scrubbing solution for reuse in a downstream oxidizer wherein an oxygen-containing gas incompletely reoxidizes the four-valent vanadium to five-valent vanadium, and wherein the pH in the scrubbing solution is less than 9.5, the improvement comprising employing the five-valent vanadium in a ratio exceeding the stoichiometric ratio for the oxidation of the hydrogen sulfide based on the reduction of total vanadium by one valence state, and wherein the total concentration of the vanadium dissolved in the scrubbing solution is maintained larger than the stoichiometric vanadium concentration for the hydrogen sulfide loading to the extent of at least the content of four-valent vanadium remaining on reoxidation in the steady state of the scrubbing process.

2. A process according to claim 1, wherein 70–90% of the four-valent vanadium is reoxidized to five-valent vanadium.

3. A process according to claim 1, wherein 70% of the four-valent vanadium is reoxidized to five-valent vanadium.

4. A process according to claim 1, wherein 90% of the four-valent vanadium is reoxidized to five-valent vanadium.

* * * * *